United States Patent [19]
Numajiri et al.

[11] Patent Number: 6,038,571
[45] Date of Patent: Mar. 14, 2000

[54] RESOURCE MANAGEMENT METHOD AND APPARATUS FOR INFORMATION PROCESSING SYSTEM OF MULTITASKING FACILITY

[75] Inventors: Yutaka Numajiri; Hiroshi Sakai, both of Tokyo, Japan

[73] Assignee: Kabushiki Kaisha Toshiba, Kawasaki, Japan

[21] Appl. No.: 08/784,928

[22] Filed: Jan. 16, 1997

[30] Foreign Application Priority Data

Jan. 31, 1996 [JP] Japan .................................. 8-015661

[51] Int. Cl.[7] .................................................. G06F 17/30
[52] U.S. Cl. ........................................... 707/206; 707/205
[58] Field of Search ....................... 707/1–10, 100–104, 707/200–206; 711/148, 159, 170, 162

[56] References Cited

U.S. PATENT DOCUMENTS

| | | |
|---|---|---|
| 5,392,415 | 2/1995 | Badovinatz et al. . |
| 5,432,917 | 7/1995 | Parikh . |
| 5,463,776 | 10/1995 | Voigt et al. . |

FOREIGN PATENT DOCUMENTS

| | | |
|---|---|---|
| 0 138 064 | 4/1985 | European Pat. Off. . |
| 0 567 421 | 10/1993 | European Pat. Off. . |
| 0 567 421 A1 | 10/1993 | European Pat. Off. . |
| WO 95/18996 | 7/1995 | WIPO . |

OTHER PUBLICATIONS

"Fail–Safe Message for 'Insufficient Disk Space,'" IBM Technical Disclosure Bulletin, vol. 37, No. 4A, Apr. 1, 994, p. 513.

Partial European Search Report, Application No. EP 97 10 0819.

Beretvas, T., et al., "Blocked Page–Out,"IBM Technical Disclosure Bulletin, vol. 26, No. 9, Feb. 1984, pp. 4753–54.

"A Self–Correcting Segment Aging Frequency Heuristic, "2244 Research Disclosure, No. 328, Aug. 1991, p. 578.

LaRowe, Richard P., Jr., et al., "The Robustness of Numa Memory Management,"Proceedings of the symposium on Operating Systems Principles, Pacific Grove, Oct. 13–16, 1991, Thirteenth ACM Association for Computing Machinery, pp. 137–151.

Troughton, D.J., et al., "System X: The Processor Utility, "British Telecommunications Engineering, vol. 3, No. 4, Jan. 1985, pp. 226–240.

*Primary Examiner*—Ruay Lian Ho
*Attorney, Agent, or Firm*—Finnegan, Henderson, Farabow, Garrett & Dunner, L.L.P.

[57] ABSTRACT

The present invention relates to a main memory space reclaiming apparatus used in a virtual memory computer system. In this apparatus, a page-out daemon process periodically scans page frames of a main memory and reclaims main memory pages which have not been accessed recently. An operating system includes a unit for acquiring the amount of free main memory, and a unit for controlling a rate at which the page-out daemon process scans the page frames according to the amount of free main memory.

24 Claims, 10 Drawing Sheets

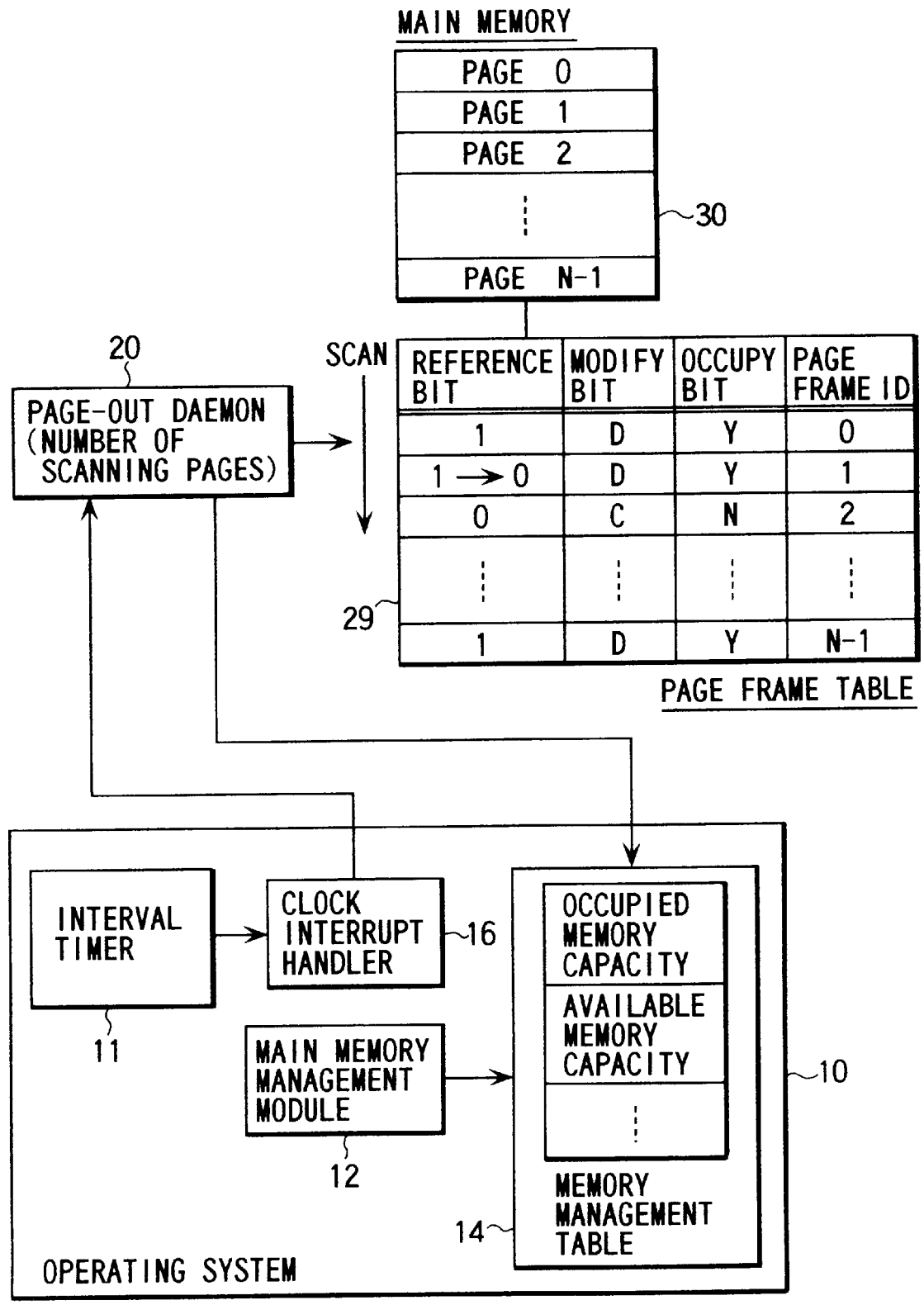
F I G. 1

POLICIES TAKEN WHEN MAIN MEMORY
CAPACITY BECOMES INSUFFICIENT

1. RECLAIM MEMORY OF PERIODIC EXECUTION PROGRAM HAVING LONG TIME TO EXECUTION TIME
2. RECLAIM MEMORY OF LOW-PRIORITY BATCH PROGRAM
3. RECLAIM MEMORY OF PROGRAM HAVING SMALLER NUMBER OF DIRTY PAGES
4. REDUCE MEMORY FREEING INTERVAL OF VIRTUAL MEMORY SYSTEM
5. RECLAIM MEMORY USED BY THE PROGRAM
6. RECLAIM MEMORY USED BY PROGRAM ISSUING MEMORY ALLOCATION REQUEST
7. REGISTER OTHER POLICIES

POLICIES TAKEN WHEN MAIN MEMORY
CAPACITY BECOMES INSUFFICIENT

1. RECLAIM MEMORY OF PERIODIC EXECUTION PROGRAM HAVING LONG TIME TO EXECUTION TIME
2. RECLAIM MEMORY OF LOW-PRIORITY BATCH PROGRAM
3. RECLAIM MEMORY OF PROGRAM HAVING SMALLER NUMBER OF DIRTY PAGES
4. REDUCE MEMORY FREEING INTERVAL OF VIRTUAL MEMORY SYSTEM
5. RECLAIM MEMORY USED BY THE PROGRAM
6. RECLAIM MEMORY USED BY PROGRAM ISSUING MEMORY ALLOCATION REQUEST
7. REGISTER OTHER POLICIES

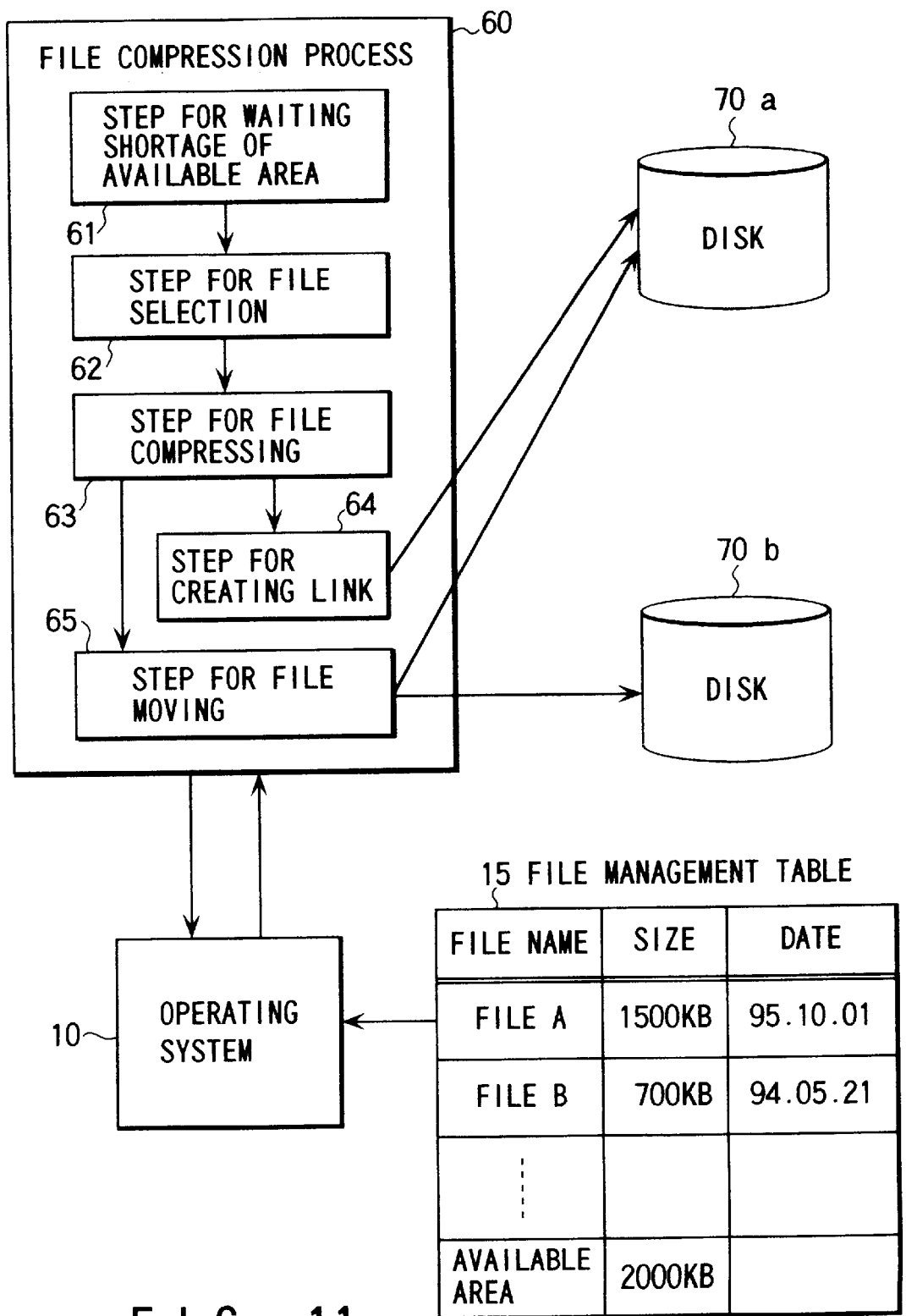
F I G. 11

RESOURCE MANAGEMENT METHOD AND APPARATUS FOR INFORMATION PROCESSING SYSTEM OF MULTITASKING FACILITY

BACKGROUND OF THE INVENTION

The present invention relates to a resource management method and apparatus for an information processing system of multitasking facility, and more specifically to a resource reclaiming method and apparatus, upon shortage of resources.

In recent years, the resource management has become more important as the size and the number of processes in a computer system increases.

Conventionally, for example, if a process requests a certain size of the main memory and the amount of free main memory is less than the required size, the process receives a result of memory allocation failure or the process is in wait state until it becomes possible to allocate that amount of memory. Particularly, if the amount of free main memory is insufficient at a process creation, the process would be terminated.

Likewise, if a process requests a certain size of the file area on the disk and the amount of the file area is less than the required size, the process receives a result of file area allocation failure or the process is in wait state until it becomes possible to allocate that amount of file area.

Thus, the problems in the prior art may be summarized as follows.

For main memory resource management, if a process requests an allocation of the main memory and the amount of free main memory is less than the required size, the process receives a result of memory allocation failure or the process is in wait state until it becomes possible to allocate that amount of memory. Therefore, it is often the case that the memory allocation request of a higher prioritized process is blocked for a long time because a lower prioritized process occupies an excess portion of the main memory. Main memory space reclaiming methods used in a conventional computer system do not manage to cope with the case sufficiently.

For disk space resource management, if a process requests an allocation of the file area on the disk and the amount of the free area is smaller than the required size, the process receives a result of file area allocation failure or the process is in wait state until it becomes possible to allocate that amount. Therefore, it is often the case that the file allocation request of a higher prioritized process is blocked for a long time or terminated because of the disk volume shortage. Disk space reclaiming methods used in a conventional computer system do not manage to cope with the case sufficiently.

BRIEF SUMMARY OF THE INVENTION

Accordingly, it is the object of the present invention to provide a resource reclaiming method and apparatus tunable to a respective computer system.

According to a first aspect of the present invention, there is provided a main memory space reclaiming method in a virtual memory computer system wherein a page-out daemon process periodically scans page frames of the main memory to reclaim main memory pages, the method comprising the steps of acquiring the amount of free main memory; and determining a rate at which the page-out daemon process scans the page frames according to the amount of free main memory.

Generally, a virtual memory system employs page frames to manage the respective physical main memory pages and a page-out daemon process and a processor's virtual memory support mechanism. A page frame, being allocated to each physical main memory page, includes a reference bit as well as other information. When a processor makes an access to a physical main memory page, the processor's virtual memory support mechanism sets the reference bit of the corresponding page frame.

The page-out daemon process, when being dispatched, scans a part of the page frames. For a page frame whose reference bit is set, the page-out daemon process clears the reference bit. For a page frame whose reference bit is cleared, the page-out daemon process reclaims the corresponding main memory page. When the page-out daemon process reaches the last page frame, it goes back to the first page frame.

According to the present invention, when the amount of free main memory is small, a page frame is scanned at shorter intervals. Therefore, a reference bit is more likely to remain cleared when the page-out daemon scans the page frame next time, which leads to reclaim more main memory pages.

On the other hand, when the amount of free main memory is large, a page frame is scanned at longer intervals. Therefore, a reference bit is more likely to be set when the page-out daemon process scans the page frame next time. By preventing the main memory pages from being reclaimed excessively, the computer system shows a better performance.

According to a second aspect of the present invention, there is provided a main memory space reclaiming method used in a computer system, comprising the steps of determining an ordered set of selecting policies for selecting a process whose physical memory pages are to be reclaimed; determining a threshold; acquiring the amount of free main memory; selecting a process among the processes which use the main memory based on said ordered set of selecting policies, when the amount of free main memory goes lower than said threshold; and reclaiming the main memory allocated to the selected process.

According to the main memory space reclaiming method, an ordered set of selecting policies and a threshold are determined preferably according to the respective computer system. When the amount of free main memory goes lower than said threshold, a process which uses a part of the main memory is selected based on the ordered set of policies and the main memory allocated to the selected process is reclaimed. Here, the meaning of an ordered set of policies is as follows. There is a linear order among the policies if there are more than one policy. The first policy is applied first to find a process. If there is a process which matches the first policy, the process is selected. Otherwise, the second policy is next applied and so forth.

By determining the ordered set of policies appropriately, a good performance is achieved in a wide variety of the computer systems. For example, it is generally preferable to select a process having a small number of updated main memory pages.

It is also important to determine the threshold according to the type of the computer system. If the risk of blocking a memory allocation for a long time is not serious, the threshold should be a small positive value. If the blocking period must be within a certain time, the threshold should be equal to the maximum size of memory allocation request.

Further, the main memory space reclaiming method can be implemented as a process running in privileged mode on an operating system. The main memory space reclaiming process, at the beginning of its execution, is given the ordered set of policies and the threshold by a system administrator or by a parameter file prepared by a system administrator. Then the main memory space reclaiming process moves into wait state. The main memory space reclaiming process is activated when the amount of free main memory goes lower than the threshold. The main memory space reclaiming process selects a process by referring the process table within the operating system and reclaims the main memory allocated to the selected process. Implementing the main memory space reclaiming method as a process brings an advantage that a system administrator can optimize the selecting a process strategy and even add a new policy by editing and compiling the source program.

According to a third aspect of the present invention, there is provided a disk space reclaiming method of a disk volume used in a computer system with a disk volume therein, the method comprising the steps of determining an ordered set of selecting policies for selecting a file in the disk volume whose data is to be compressed; determining a first threshold; acquiring the amount of free area of the disk volume; selecting a file among the files which exist in the disk volume according to said ordered set of selecting policies, when the amount of free area of the disk volume goes lower than said first threshold; compressing the selected file; and reclaiming the surplus area created by the compression.

According to the disk space reclaiming method, an ordered set of selecting policies and a threshold are determined preferably according to the respective computer system. When the amount of free area of the disk volume goes lower than said threshold, a file which exists in the disk volume is selected based on the ordered set of policies, the selected file is compressed, and the surplus area created by the compression is reclaimed.

By determining the ordered set of policies appropriately, a good performance is achieved in a wide variety of the computer systems. For example, it is generally preferable to select a file which has not been accessed recently.

It is also important to determine the threshold according to the type of the computer system. If the risk of blocking a file allocation for a long time is not serious, the threshold should be zero or a small positive value. If the blocking period must be within a certain time, the threshold should be equal to the maximum size of file allocation request.

Further, the disk space reclaiming method can be implemented as a process with privileged file access permission. The disk space reclaiming process, at the beginning of its execution, is given the ordered set of policies and the threshold by a system administrator or by a parameter file prepared by a system administrator. Then the disk space reclaiming process moves into wait state. The disk space reclaiming process is activated when the amount of free area of the disk volume goes lower than the threshold. The disk space reclaiming process selects a file within the disk volume, compresses the selected file, and reclaims the surplus area created by the compression. Implementing the disk space reclaiming method as a process brings an advantage that a system administrator can optimize the file selection strategy and even add a new policy by editing and compiling the source program.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a function block diagram showing the schematic construction of a main memory space reclaiming apparatus according to a first embodiment of the present invention;

FIGS. 4A and 4B are examples of policies displayed on a monitor screen so as to enable a system administrator to select policies according to the second embodiment;

FIG. 11 is a function block diagram showing the schematic construction of a disk space reclaiming apparatus according to a fourth embodiment of the present invention.

DETAILED DESCRIPTION OF THE INVENTION

Figure 2:
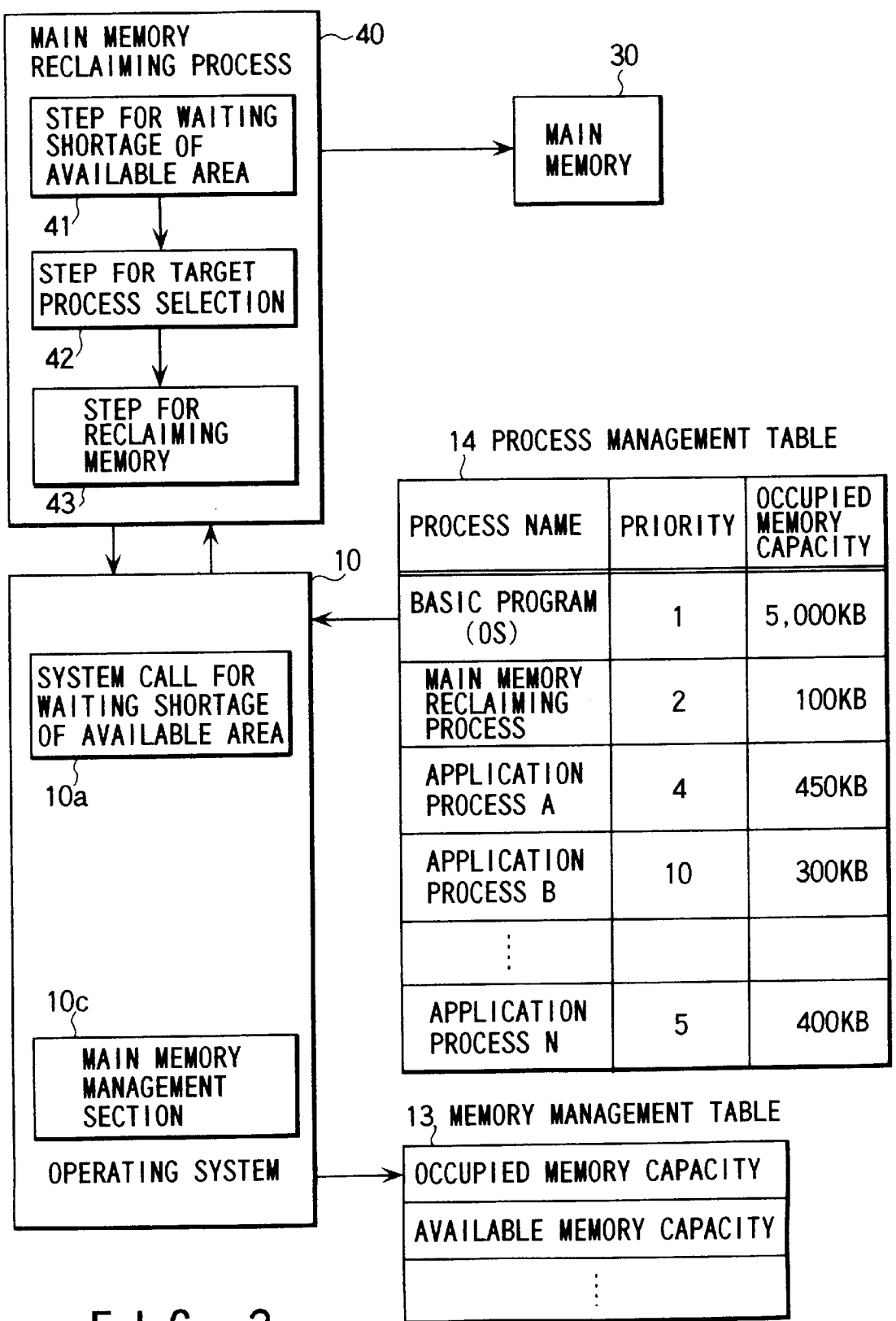
FIG. 2 is a function block diagram showing the schematic construction of a main memory space reclaiming apparatus according to a second embodiment of the present invention.

There will now be described embodiments of the present invention with reference to the accompanying drawings.

(First Embodiment)

FIG. 1 is a function block diagram showing the schematic construction of a main memory space reclaiming apparatus according to a first embodiment of the present invention.

In the main memory space reclaiming apparatus according to this embodiment, the whole control operation is effected by an operating system 10, and in the operating system 10, an interval timer 11 generates a interrupt signal at predetermined intervals. In response to this interrupt signal, a clock interrupt handler 16 dispatches a page-out daemon process 20.

When being dispatched, the page-out daemon process 20 scans a certain number of page frames 29 (scans the page frames cyclically), and checks the reference bit of each page frame and clears the reference bit (to "0") when the reference bit is set (at "1").

A reference bit is set when the processor accesses the page corresponding to the reference bit. Therefore, a clean reference bit means that no access to the page by the processor has been made since the preceding scanning. Therefore, in this case, the page-out daemon process 20 reclaims the memory page.

The main memory management module 12 in this embodiment maintains the number of available pages in the main memory 30 within the memory management table 14. The page-out daemon process 20 determines the number of page frames to be scanned. After scanning that number of page frames, the page-out daemon process 20 sleeps until a next interrupt signal is generated by the interval timer 11. With another method, it is possible to arrange that the main memory management module 12 determines and provides the number of page frames to the page-out daemon process 20.

If the amount of free main memory is small, the number of page frames to be scanned at each dispatching of the page-out daemon process 20 should be a larger value so as to accelerate the scanning rate of the page frames.

If the amount of free main memory is sufficiently large, the performance of the whole system can be kept in a good condition by setting the number of page frames to be scanned at each dispatching of the page-out daemon process 20 to a smaller value so as to preventing the main memory pages being used from being excessively reclaimed.

Thus, the adequate and efficient main memory space reclaiming can be effected according to the amount of free main memory. Instead of changing the number of page frames scanned at each dispatching of the page-out daemon process 20, it is possible to change the frequency in which the clock interrupt handler 16 dispatches the page-out daemon process 20 so as to attain the same effect.

(Second Embodiment)

Next, a second embodiment of the present invention is explained with reference to FIGS. 2 to 5.

FIG. 2 is a function block diagram showing the schematic construction of a main memory space reclaiming apparatus according to a second embodiment of the present invention.

In the main memory space reclaiming apparatus according to this embodiment, the whole control operation is effected by an operating system 10, and the operating system 10 manages the memory management table 13 and the process management table 14. The operating system 10 dispatches a main memory reclaiming process 40 when the amount of free main memory on the memory management table 13 becomes smaller than a preset value.

The main memory reclaiming process 40 operates with reference to the memory management table 13 and process management table 14.

As shown in FIG. 2, the main memory reclaiming process 40 executes step 41. At step 41, a system call 10a is called so as to wait for the event of available area shortage.

Assume now that a part of the main memory 30 is newly allocated to one of the processes and, as a result, the amount of available memory goes lower than a threshold. Then, the operating system 10 dispatches the main memory reclaiming process 40.

Thereafter, at step 42, the main memory reclaiming process 40 selects a process whose priority level is the lowest, for example, with reference to the process management table 14. At step 43, the pages allocated to the selected process are reclaimed. As the method of reclaiming operation, termination or swap-out of the process are considered. By the reclaiming operation, the memory shortage is solved.

As a result, there occurs no problem that a high-priority process will not be executed for a long time because of the presence of low-priority processes, for example, and the adequate main memory space reclaiming can be attained.

If there are processes executed at regular intervals, it is effective to select a process based on the next scheduled time thereof instead of the priority. In another case, it is effective to select a batch process whose termination time is not specified, or to select a process having a less number of updated memories by taking the required memory reclaiming time into consideration. The selection can be effected by use of the process management table 14. Further, it is sometimes effective to reclaim the memory allocated to the main memory reclaiming process 40 itself.

Since the main memory reclaiming process 40 is dispatched only when the amount of free main memory becomes smaller than a preset value, unnecessary overhead will not occur when the amount of free main memory is sufficiently large. Further, since it is constructed as a process running in privileged mode under the control of the operating system 10, the main memory space reclaiming rule of the main memory 30 can be added and modified simply by rewriting and compiling the program source code and flexibility can be attained.

Figures 3, 7:
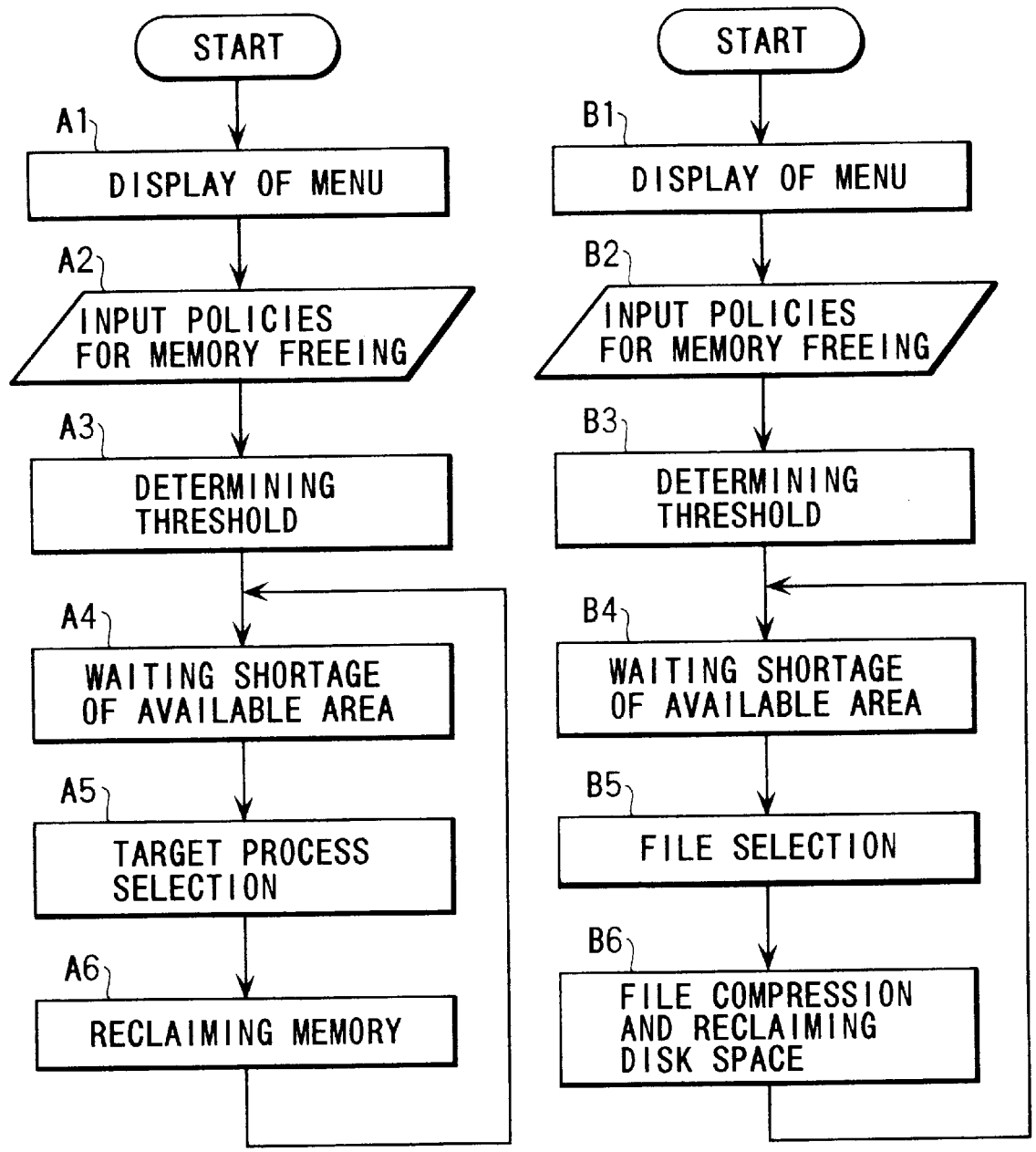
FIG. 3 is a flowchart for illustrating the operation procedure of the main memory space reclaiming apparatus according to the second embodiment.
FIG. 7 is a flowchart for illustrating the operation procedure of the disk space reclaiming apparatus according to the third embodiment.

FIG. 3 shows the operation procedure of the main memory space reclaiming process of this embodiment.

In the main memory space reclaiming process of this embodiment, a menu of the process selection policies is displayed (step A1) as shown in FIG. 4A so that the system administrator can select desired policies. Then, the system administrator inputs the numbers of the desired policies into a field 51 (step A2).

FIG. 4B shows the result of selection by the system administrator, and in this case, the policy 2, policy 1 and policy 4 are selected in this order.

In this manner, the ordered set of policies for selecting a process are determined. Subsequently, a threshold is determined (step A3).

Thereafter, the main memory reclaiming process 40 waits for the event of available area shortage (step A4). When the amount of free main memory goes lower than the threshold, the main memory reclaiming process 40 is dispatched and thus selects a target process (step A5), and reclaims the main memory 30 allocated to the selected process (step A6). After this, the operation of the steps A4 to A6 is repeatedly effected until an instruction for terminating the main memory reclaiming process 40 is issued from the operating system 10.

At step A5, the policies are applied one by one according to the priority specified in the field 51 of FIG. 4B. That is, in the field 51 shown in FIG. 4B, the numbers 2, 1, 4 are specified in this order. Specifically, if a process corresponding to the policy "2" is present, this process is selected. If not, it is determined whether or not a process corresponding to the policy "1" is present. If the process corresponding to the policy "1" is present, this process is selected. If not, it is determined whether or not a process corresponding to the policy "4" is present.

Next, the operation principle of the main memory space reclaiming process is explained with reference to FIG. 5.

Figure 5:
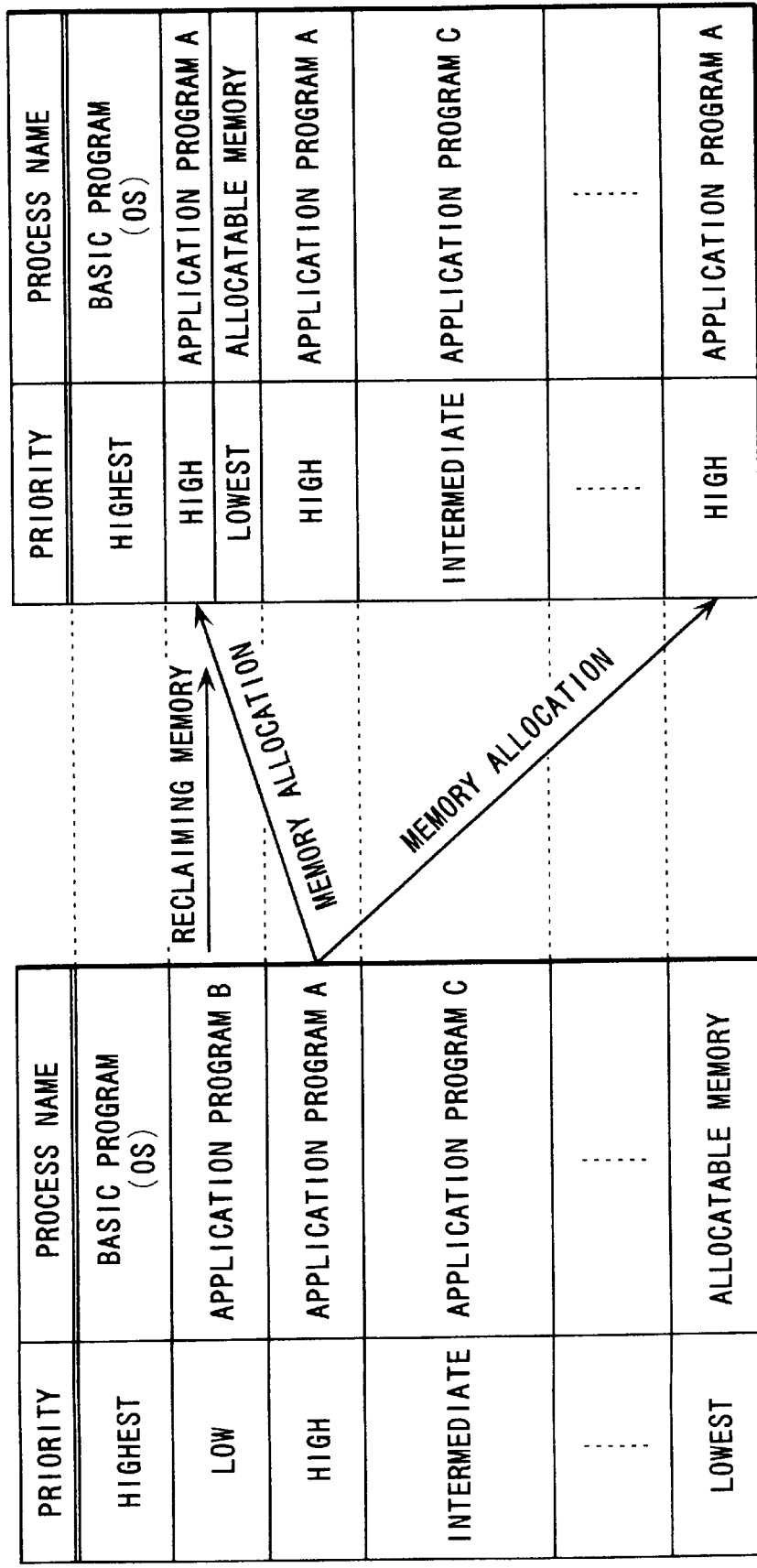
FIG. 5 is a conceptional diagram for illustrating the operation principle of the main memory space reclaiming apparatus according to the second embodiment.

Assume now that the main memory 30 is allocated as shown on the left side of FIG. 5. If the application process A newly requests the amount of memory larger than the amount of free main memory, the main memory reclaiming process 40 forcedly reclaims the memory used by the application process B of the lowest priority. Then, the reclaimed memory area is allocated for the application process A and the high-priority application process A can be continuously executed as shown on the right side of FIG. 5.

If the application process A should not be suspended by the memory reclamation, the preset threshold should be high enough. Then the memory reclamation would be performed in advance.

As a result, adequate main memory space reclaiming can be attained.

(Third Embodiment)

Next, a third embodiment of the present invention is explained with reference to FIGS. 6 to 10.

Figure 6:
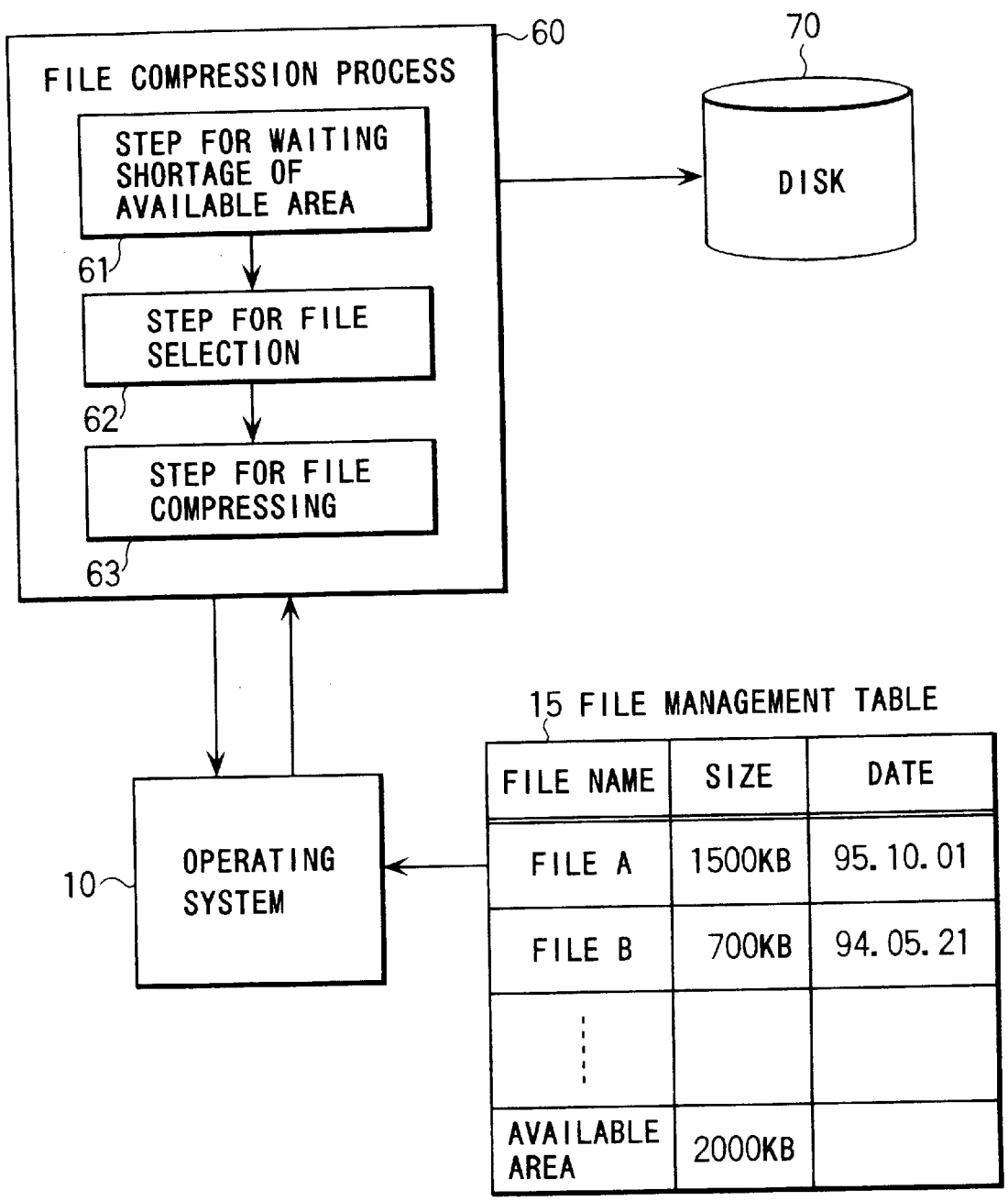
FIG. 6 is a function block diagram showing the schematic construction of a disk space reclaiming apparatus according to a third embodiment of the present invention.

FIG. 6 is a function block diagram showing the schematic construction of a disk space reclaiming apparatus according to the third embodiment of the present invention.

In the disk space reclaiming apparatus of this embodiment, the whole control operation is effected by an operating system 10, and the operating system 10 manages file management table 15. The operating system 10 dispatches a file compression process 60 when the amount of free area of the disk 70 becomes smaller than a preset value.

The file compression process 60 operates with reference to the file management table 15 which the operating system 10 manages. As shown in FIG. 6, a file compression process 60 comprises step 61 for waiting for the event of available area shortage, step 62 for file selection, and step 63 for file compression. First, at step 61, the file compression process 60 calls the operating system 10 and sleeps until the free area of disk 70 becomes insufficient.

Assume now that a request for creation or extension of a file is newly made, and as a result, the size of the remaining free area becomes smaller than the preset value, that is, the amount of free area of disk 70 becomes insufficient. Then, the operating system 10 dispatches the file compression process 60. The file compression process 60 selects a file having the oldest date, for example, with reference to the file management table 15 at step 62. At step 63, the file is compressed and the surplus area is reclaimed for future allocation.

For example, it is also effective to select a file used as a backup file. Further, it is effective to estimate the size of a file after being compressed, and select a file based on the estimated size after being compressed and the required size to be reclaimed.

For example, it is considered that a text file can be compressed more than a picture file of MPEG or JPEG format.

Since the file compression process 60 is dispatched when the amount of free file area of the disk 70 becomes smaller than a preset value, unnecessary overhead will not occur if the amount of free area of the disk 70 is large enough. Further, since it is implemented as a process running under the control of the operating system 10, it becomes possible to add and modify the disk space reclaiming rule of the disk 70 simply by rewriting the source code and the flexibility thereof can be attained.

FIG. 7 shows the operation procedure of the disk space reclaiming process of this embodiment.

In the disk space reclaiming process of this embodiment, a menu of the file selection policies as shown in FIG. 4A so that the system administrator can select desired policies.

Then, the system administrator inputs the numbers of the desired policies into a field (step B2).

In this manner, the ordered set of policies for selecting a file are determined. Subsequently, a threshold is determined (step B3).

Thereafter, the file compression process 60 waits for the event of free disk volume shortage (step B4). When the amount of free file area of the disk 70 goes lower than the threshold, the file compression process 60 is dispatched and thus selects a file (step B5), and compresses the file and reclaims the surplus disk space (step B6). After this, the operation of the steps B4 to B6 is repeatedly effected until an instruction for terminating the file compression process 60 is issued from the operating system 10.

At step B5, the policies are applied one by one according to their priorities, like in the case of the second embodiment. As an exemplary policy in this embodiment, it is desired to preferentially select a file which has been updated least recently, or to select a backup file.

The operation principle of this embodiment is explained with reference to FIG. 8.

Figure 8:
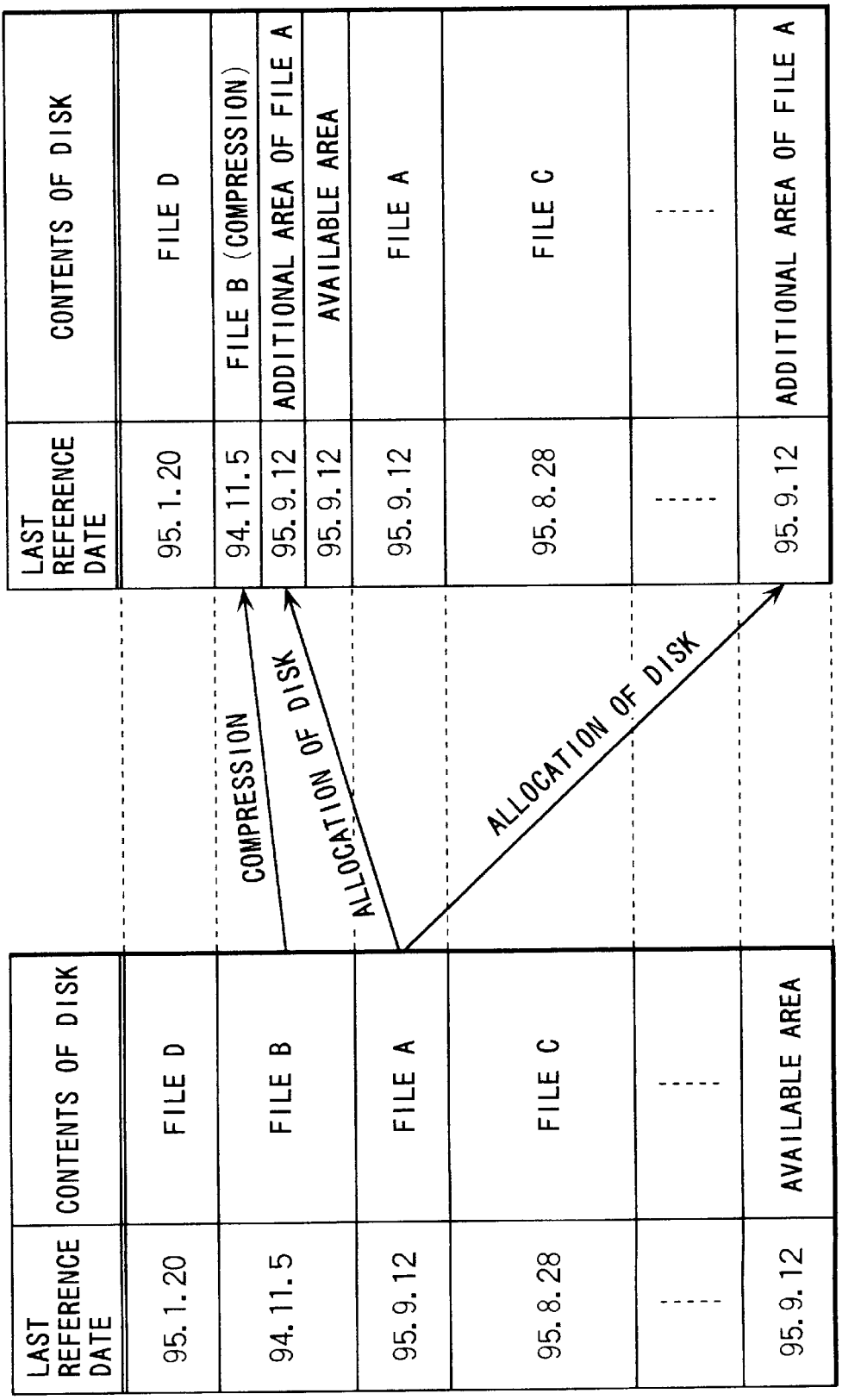
FIG. 8 is a conceptional diagram for illustrating the operation principle of the disk space reclaiming apparatus according to the third embodiment.

Assume now that the disk 70 is allocated as shown on the left side of FIG. 8. If a process newly requests a free file area larger than the amount of current free file area of the disk 70, the file compression process 60 selects and compresses a file B in accordance with the ordered set of policies. The file area reclaimed as the result of compression is allocated for the request.

If a process should not be suspended by the compression, the preset threshold should be high enough. Then the file compression would be performed in advance.

As a result, adequate disk space reclaiming can be attained.

Figure 9:
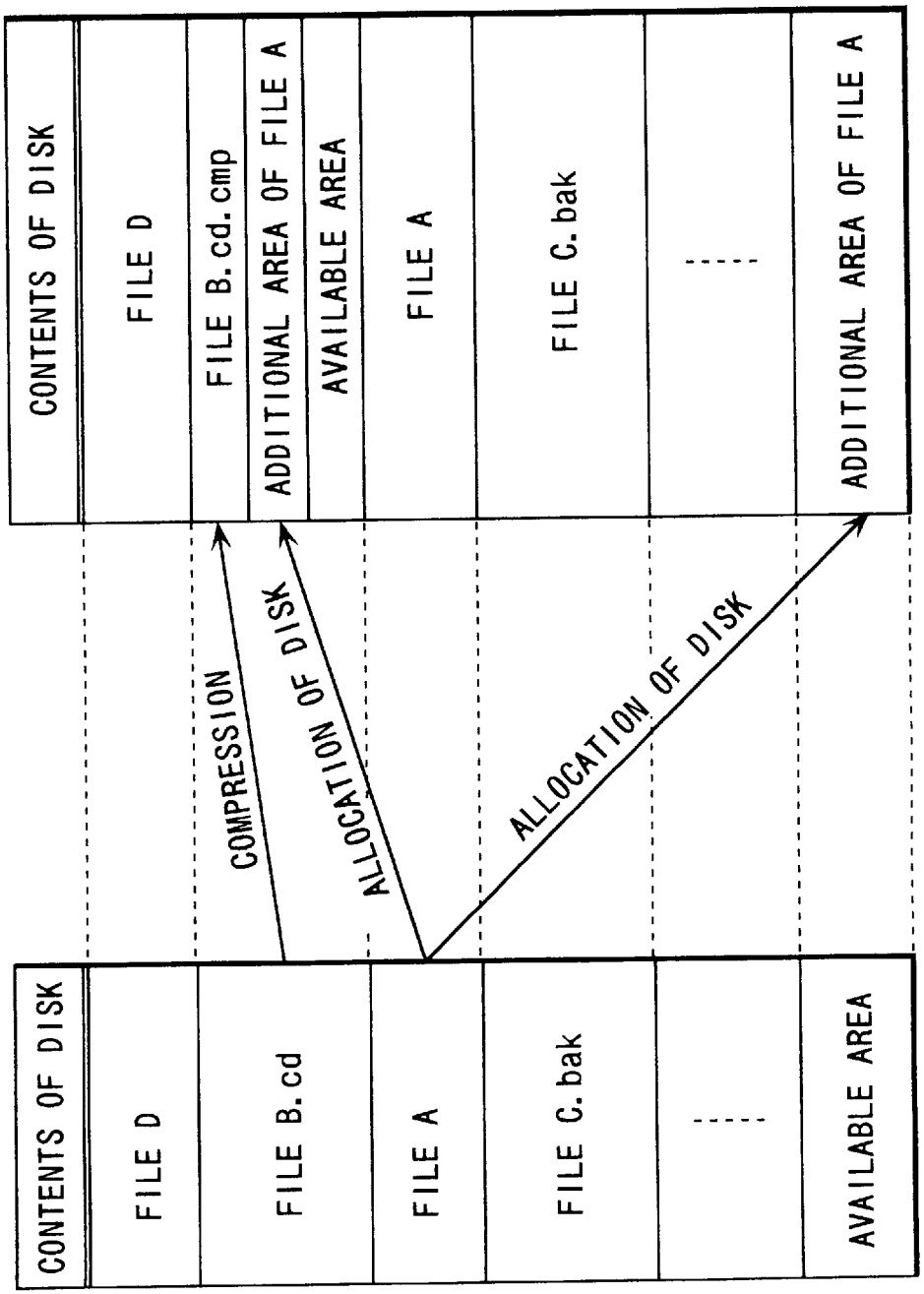
FIG. 9 is a conceptional diagram for illustrating the operation principle of the disk space reclaiming apparatus according to the third embodiment.

Further, as shown in FIG. 9, for example, if a file provided as a backup file (a file to which ".bak" is added as a file name extension) is present, more adequate disk space reclaiming can be attained by preferentially selecting this file.

Figure 10A:
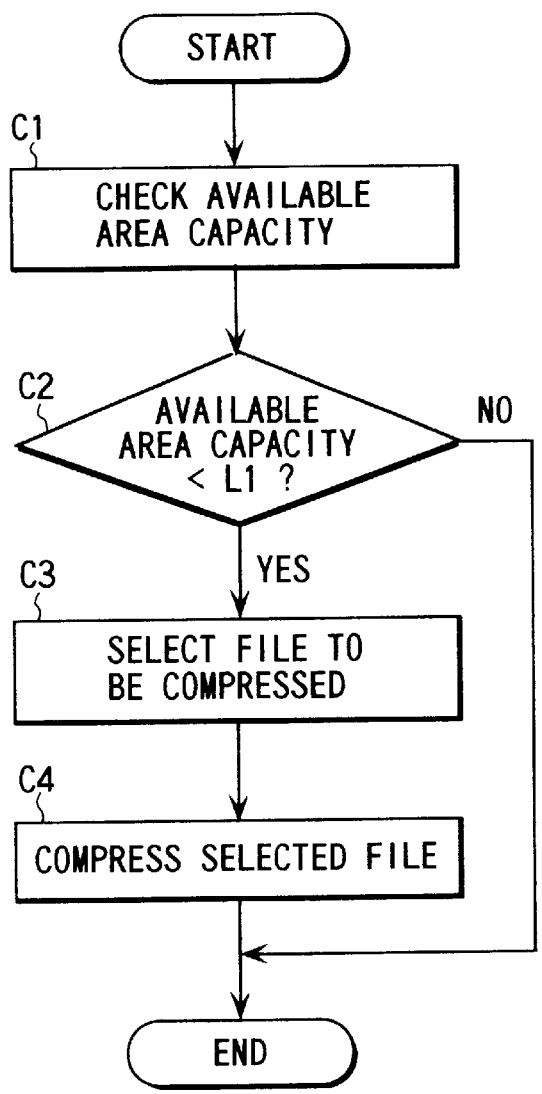
FIGS. 10A and 10B are flowcharts for illustrating the operation procedure of the disk space reclaiming apparatus according to the third embodiment.
Figure 10B:
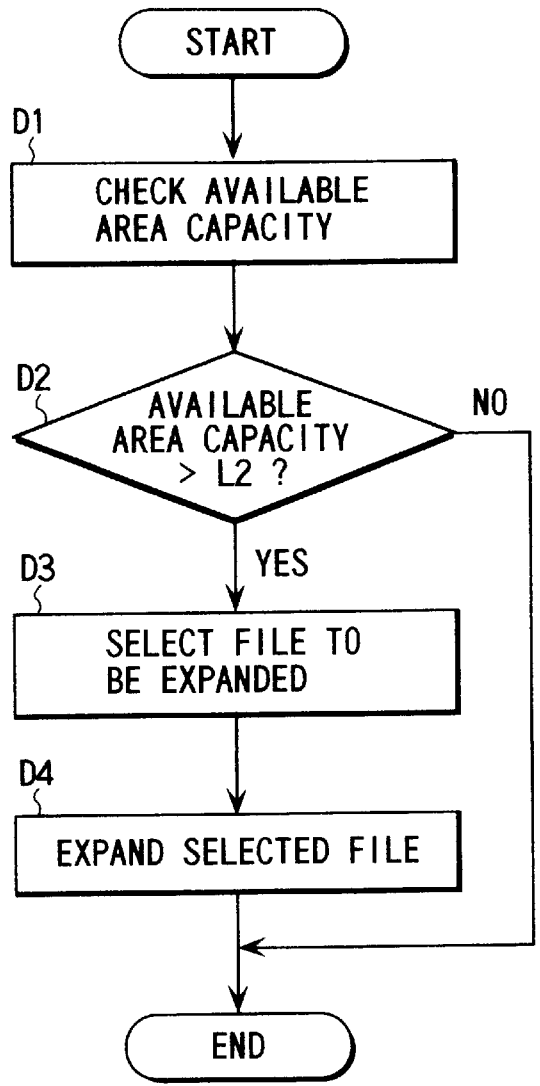

In the flowchart of FIG. 7 described above, the selection and compression are executed when the amount of free file area becomes smaller than a preset value (a threshold L1). In this case, the selection and expansion may also be executed when the amount of free file area becomes larger than a second preset value (a threshold L2). An operation in this case will be described with reference to FIGS. 10A and 10B. FIG. 10A relates to a compression process, whereas FIG. 10B relates to an expansion process.

First, the compression process is described below.

The amount of free file area of the disk 70 is monitored by the operating system 10 (step C1). The operating system 10 determines whether or not the amount of free file area is smaller than the threshold L1 (step C2). If yes, the operating system 10 dispatches the file compression process 60. Consequently, a file is selected by the file compression process 60 in accordance with the ordered set of policies specified in an aforementioned manner (step C3). Then, the selected file is compressed (step C4).

Next, the expansion process is described below.

Similar to the above case, the amount of free file area of the disk 70 is monitored by the operating system 10 (step D1). The operating system 10 determines whether or not the amount of free file area is larger than the threshold L2 (step D2). If yes, the operating system 10 dispatches the file expansion process (not shown). Consequently, a file is selected by the file expansion process (step D3). Then, the file is expanded (uncompressed) (step D4).

As described above, using the expansion process, it is possible to access a file without any performance overhead when the amount of free file area becomes sufficiently large.

(Fourth Embodiment)

Next, a third embodiment of the present invention is explained with reference to FIG. 11.

FIG. 11 is a function block diagram showing the schematic construction of a disk space reclaiming apparatus according to a fourth embodiment of this invention.

In the disk space reclaiming apparatus of this embodiment, the file compression process 60 further includes a link creating step 64 and a file moving step 65 in addition to the third embodiment.

In the file compression process 60 of this embodiment, for example, when the file compressing step 63 compresses a file of a disk 70a which is selected by the file selecting step 62, the file moving step 65 moves the compressed file from the disk 70a to a disk 70b which is a sub-disk and the link creating step 64 creates a link information at the original location in disk 70a.

As a result, for the disk 70a which is a main disk, the more adequate disk space reclaiming can be attained.

As described above, according to the present invention, an efficient and flexible resource management is attained for wide variety of computer systems.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the process and units included in either of the main memory space reclaiming apparatus or the disk space reclaiming apparatus may be prestored in a storing medium in form of a computer program, and may be read out therefrom and executed by a processor, as needed.

We claim:

1. A main memory space reclaiming method in a virtual memory computer system wherein a page-out daemon process periodically scans page frames of the main memory to reclaim main memory pages, the method comprising the steps of:

acquiring the amount of free main memory; and determining a rate at which the page-out daemon process scans the page frames according to the amount of free main memory.

2. The method according to claim 1 wherein the rate determining step includes the steps of:

making the page-out daemon process, when being dispatched, scans more page frames when the amount of free main memory decreases; and making the page-out daemon process, when being dispatched, scans less page frames when the amount of free main memory increases.

3. The method according to claim 1, wherein the rate determining step includes the steps of:

dispatching the page-out daemon process more frequently when the amount of free main memory decreases; and dispatching the page-out daemon process less frequently when the amount of free main memory increases.

4. A main memory space reclaiming method used in a computer system, comprising the steps of:

determining an ordered set of selecting policies for selecting a process whose physical memory pages are to be reclaimed;

determining a threshold;

acquiring the amount of free main memory;

selecting a process among the processes which use the main memory based on said ordered set of selecting policies, when the amount of free main memory goes lower than said threshold; and reclaiming the main memory allocated to the selected process.

5. The method according to claim 4, wherein said ordered set of policies includes a policy to select a process having a long period of time for the next execution among processes which are dispatched regularly.

6. The method according to claim 4, wherein said ordered set of policies includes a policy to select a low prioritized process.

7. The method according to claim 4, wherein said ordered set of policies includes a policy to select a process having a small number of updated main memory pages.

8. The method according to claim 4, wherein said method is implemented as a process running in privileged mode and said ordered set of policies and said threshold are determined at the beginning of the process.

9. The method according to claim 4, wherein said method is implemented as a process running in privileged mode and said ordered set of policies includes a policy which selects the process which realizes said main memory reclaiming step.

10. A disk space reclaiming method of a disk volume used in a computer system with a disk volume therein, the method comprising the steps of:

determining an ordered set of selecting policies for selecting a file in the disk volume whose data is to be compressed;

determining a first threshold;

acquiring the amount of free area of the disk volume;

selecting a file among the files which exist in the disk volume according to said ordered set of selecting policies, when the amount of free area of the disk volume goes lower than said first threshold;

compressing the selected file; and reclaiming the surplus area created by the compression.

11. The method according to claim 10, wherein said ordered set of selecting policies includes a policy to select a file which has not been accessed recently.

12. The method according to claim 10, wherein said ordered set of selecting policies includes a policy to select a backup file.

13. The method according to claim 10, wherein said ordered set of selecting policies includes a policy to select a file which has not been updated recently.

14. The method according to claim 10, wherein said ordered set of selecting policies includes a policy to select a file according to the file size.

15. The method according to claim 10, wherein said ordered set of selecting policies includes a policy to select a file according to the file type.

16. The method according to claim 10, further comprising the steps of:

determining a second threshold which is larger than said first threshold; and expanding a compressed file when the amount of free area of the disk volume goes higher than said second threshold.

17. A disk space reclaiming method of a disk volume used in a computer system with a plurality of disk volumes therein, the method comprising the steps of:

determining an ordered set of selecting policies for selecting a file in a first disk volume whose data is to be compressed;

determining a threshold;

acquiring the amount of free area of the first disk volume;

selecting a file among the files which exist in the first disk volume according to said ordered set of selecting policies, when the amount of free area of the first disk volume goes lower than said threshold;

compressing and moving the selected file into a second disk volume;

creating a link information between the source location of the first disk volume and the destination location of the second disk volume; and reclaiming the surplus area created in the first disk volume.

18. A main memory space reclaiming apparatus used in a virtual memory computer system, comprising:

a page-out daemon process which periodically scans page frames of main memory and reclaims main memory pages which have not been accessed recently;

means for acquiring the amount of free main memory; and means for controlling a rate at which the page-out daemon process scans the page frames according to the amount of free main memory.

19. A main memory space reclaiming apparatus used in a computer system, comprising:

means for determining an ordered set of selecting policies for selecting a process whose physical memory pages are to be reclaimed;

means for determining a threshold;

means for acquiring the amount of free main memory;

a reclaiming process which selects a process among the processes which use the main memory based on said ordered set of selecting policies and reclaims the main memory allocated to the selected process; and dispatching means for dispatching said reclaiming process, when the amount of free main memory goes lower than said threshold.

20. A disk space reclaiming apparatus of a disk volume used in a computer system with a disk volume therein, comprising:

means for determining an ordered set of selecting policies for selecting a file in the disk volume whose data is to be compressed;

means for determining a threshold;

means for acquiring the amount of free area of the disk volume;

a reclaiming process which selects a file among the files which exist in the disk volume according to said ordered set of selecting policies and compresses the selected file and reclaims the surplus area created by the compression; and dispatching means for dispatching said reclaiming process, when the amount of free area of the disk volume goes lower than said threshold.

21. A disk space reclaiming apparatus of a disk volume used in a computer system with a plurality of disk volumes therein, comprising:

means for determining an ordered set of selecting policies for selecting a file in a first disk volume whose data is to be compressed;

means for determining a threshold;

means for acquiring the amount of free area of the first disk volume;

a reclaiming process which selects a file among the files which exist in the first disk volume according to said ordered set of selecting policies, and compresses and moves the selected file into a second disk volume and creates a link information between the source location of the first disk volume and the destination location of the second disk volume; and a dispatching mean for dispatching said reclaiming process, when the amount of free area of the disk volume goes lower than said threshold.

22. A storage medium having a computer program stored thereon which is capable of performing a main memory space reclaiming process in a virtual memory computer system when executed by a processor, said computer program comprising:

a page-out daemon process which periodically scans page frames of a main memory and reclaims main memory pages which have not been accessed recently;

means for acquiring the amount of free main memory; and means for controlling a rate at which the page-out daemon process scans the page frames according to the amount of free main memory.

23. A storage medium having a computer program stored thereon which is capable of performing a main memory space reclaiming process in a virtual memory computer system when executed by a processor, said computer program comprising:

means for determining an ordered set of selecting policies for selecting a process whose physical memory pages are to be reclaimed;

means for determining a threshold;

means for acquiring the amount of free main memory;

a reclaiming process which selects a process among the processes which use the main memory based on said ordered set of selecting policies and reclaims the main memory allocated to the selected process; and dispatching means for dispatching said reclaiming process, when the amount of free main memory goes lower than said threshold.

24. A storage medium having a computer program stored thereon which is capable of performing a disk space reclaiming process of a disk volume used in a computer system when executed by a processor, said computer program comprising:

means for determining an ordered set of selecting policies for selecting a file in the disk volume whose data is to be compressed;

means for determining a threshold;

means for acquiring the amount of free area of the disk volume;

a reclaiming process which selects a file among the files which exist in the disk volume according to said ordered set of selecting policies and compresses the selected file and reclaims the surplus area created by the compression; and dispatching means for dispatching said reclaiming process, when the amount of free area of the disk volume goes lower than said threshold.

* * * * *